(12) United States Patent
Okino

(10) Patent No.: US 12,172,083 B2
(45) Date of Patent: Dec. 24, 2024

(54) INFORMATION PROCESSING APPARATUS AND FILE GENERATION METHOD

(71) Applicant: SONY INTERACTIVE ENTERTAINMENT INC., Tokyo (JP)

(72) Inventor: Naoto Okino, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 269 days.

(21) Appl. No.: 17/766,538

(22) PCT Filed: Sep. 28, 2020

(86) PCT No.: PCT/JP2020/036711
§ 371 (c)(1),
(2) Date: Apr. 5, 2022

(87) PCT Pub. No.: WO2021/090608
PCT Pub. Date: May 14, 2021

(65) Prior Publication Data
US 2023/0053330 A1    Feb. 23, 2023

(30) Foreign Application Priority Data
Nov. 5, 2019 (JP) ................................ 2019-200774

(51) Int. Cl.
*A63F 13/77* (2014.01)
*A63F 13/497* (2014.01)
(Continued)

(52) U.S. Cl.
CPC ............ *A63F 13/77* (2014.09); *A63F 13/497* (2014.09); *G06F 16/16* (2019.01); *G06T 1/60* (2013.01); *A63F 2300/554* (2013.01)

(58) Field of Classification Search
CPC ........ A63F 13/45; A63F 13/59; A63F 13/493; A63F 13/497; A63F 13/70; A63F 2300/554; G06F 16/16; G06T 1/60
See application file for complete search history.

(56) References Cited

U.S. PATENT DOCUMENTS 5,675,785 A * 10/1997 Hall ...................... G06F 16/283
  707/999.102
7,825,961 B2 * 11/2010 Koba ...................... G11B 27/11
  348/374

(Continued)

FOREIGN PATENT DOCUMENTS

JP    2001-313908 A    11/2001
JP    2002-260336 A    9/2002
(Continued)

OTHER PUBLICATIONS

JP 2001-313908 A, machine translation, downloaded from https://www.jplatpat.inpit.go.jp/ on Mar. 14, 2024.*
(Continued)

*Primary Examiner* — David L Lewis
*Assistant Examiner* — Matthew D Hoel
(74) *Attorney, Agent, or Firm* — XSENSUS LLP

(57) ABSTRACT

An output processing unit 112 generates image data of a game being played by a user. A ring buffer 118 records the image data generated by the output processing unit 112. A file generation unit 124 generates a map file which is used to reproduce the image data recorded on the ring buffer 118 in the order in which the image data has been recorded on the ring buffer 118, and then records the map file on a file recording unit 126.

6 Claims, 6 Drawing Sheets

(51) Int. Cl.
*G06F 16/16* (2019.01)
*G06T 1/60* (2006.01)

(56) References Cited

U.S. PATENT DOCUMENTS

| | | | | |
|---|---|---|---|---|
| 9,479,618 | B2* | 10/2016 | Bischoff | H04L 67/131 |
| 10,166,467 | B2* | 1/2019 | Okino | A63F 13/35 |
| 11,848,033 | B2* | 12/2023 | Okino | A63F 13/95 |
| 2005/0234858 | A1* | 10/2005 | Torii | G11B 27/034 |
| 2006/0092785 | A1* | 5/2006 | Takashima | G11B 27/329 |
| | | | | 369/47.1 |
| 2007/0061539 | A1* | 3/2007 | Nonaka | G06F 3/0685 |
| | | | | 711/170 |
| 2009/0047002 | A1* | 2/2009 | Morimoto | G11B 27/329 |
| | | | | 386/335 |
| 2009/0132621 | A1* | 5/2009 | Jensen | G06F 3/0643 |
| 2010/0195989 | A1* | 8/2010 | Amano | H04N 19/61 |
| | | | | 386/E5.003 |
| 2010/0316349 | A1* | 12/2010 | Nagano | G11B 27/105 |
| | | | | 386/230 |
| 2015/0126283 | A1* | 5/2015 | Okino | A63F 13/71 |
| | | | | 463/42 |
| 2015/0126288 | A1* | 5/2015 | Okino | G11B 20/10527 |
| | | | | 463/43 |
| 2015/0281328 | A1* | 10/2015 | Bischoff | A63F 13/30 |
| | | | | 709/203 |
| 2016/0105632 | A1* | 4/2016 | Endo | H04N 5/772 |
| | | | | 386/225 |
| 2022/0176256 | A1* | 6/2022 | Neuenfeldt | H04N 21/44213 |
| 2022/0226735 | A1* | 7/2022 | Okino | G06F 16/137 |
| 2022/0362676 | A1* | 11/2022 | Uno | A63F 13/497 |
| 2023/0053330 | A1* | 2/2023 | Okino | G06F 3/048 |
| 2023/0062039 | A1* | 3/2023 | Okino | A63F 13/77 |

FOREIGN PATENT DOCUMENTS

| | | |
|---|---|---|
| JP | 2010-183370 A | 8/2010 |
| JP | 2014-092991 A | 5/2014 |
| JP | 2015-198404 A | 11/2015 |
| JP | 2016-116196 A | 6/2016 |

OTHER PUBLICATIONS

JP 2010-183370 A, machine translation, downloaded from https://www.jplatpat.inpit.go.jp/ on Mar. 14, 2024.*
International Search Report and Written Opinion mailed Dec. 15, 2020, from PCT/JP2020/036711, 9 sheets.

* cited by examiner

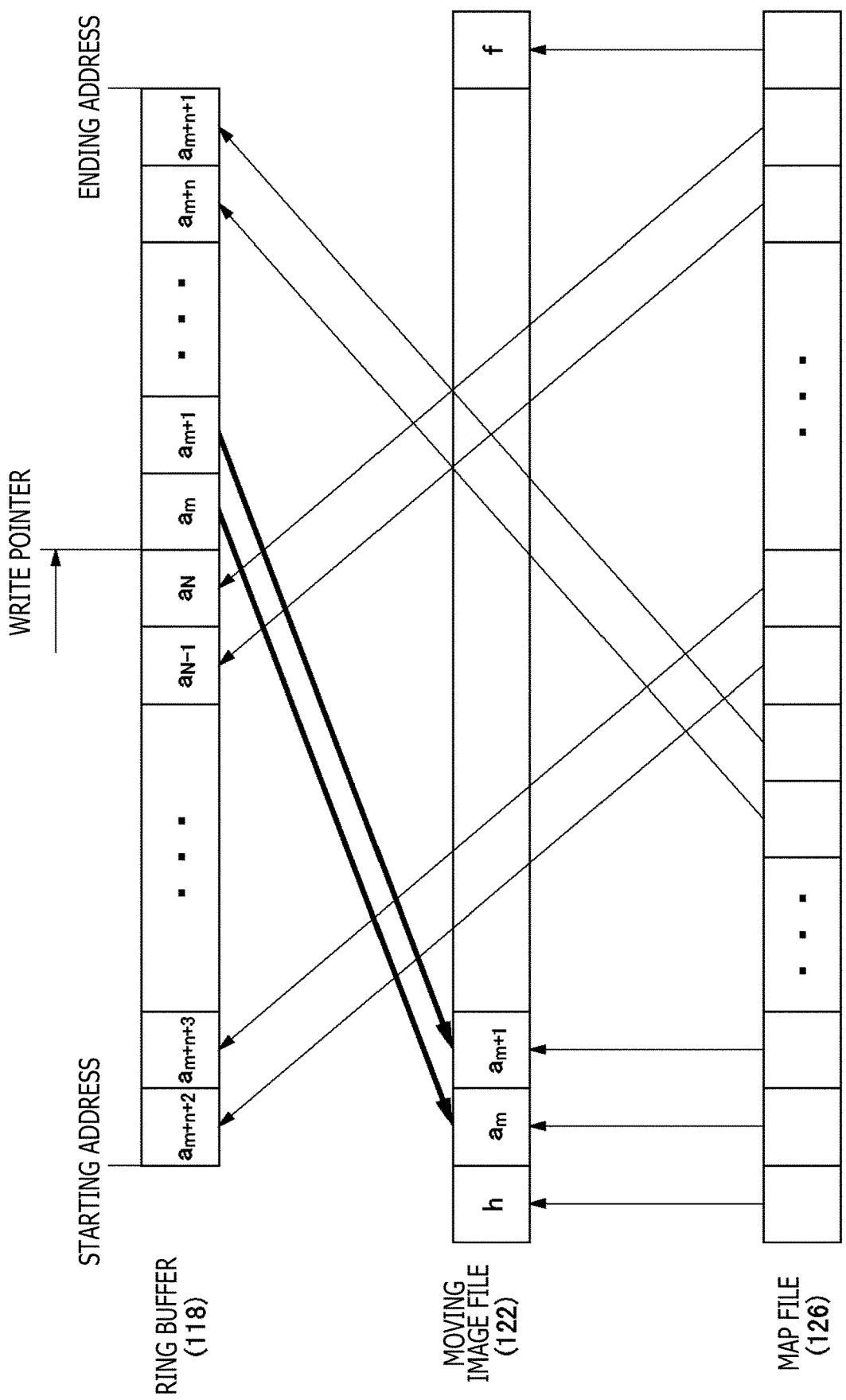

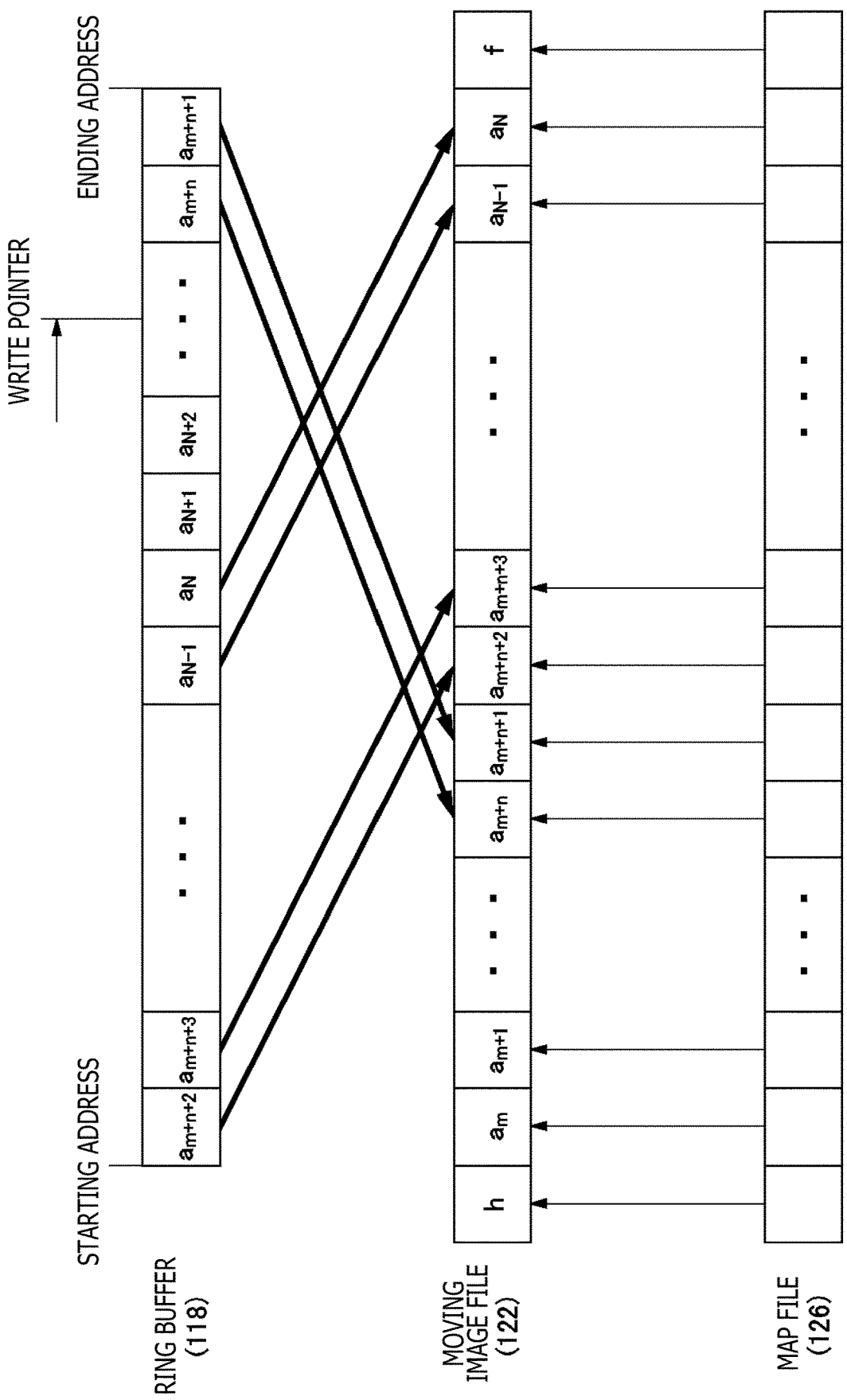

INFORMATION PROCESSING APPARATUS AND FILE GENERATION METHOD

TECHNICAL FIELD

The present invention relates to a technology which enables image data recorded on a ring buffer to be promptly reproduced.

BACKGROUND ART

PTL 1 discloses an information processing apparatus provided with a recording control unit that background-records game images displayed on a display onto a ring buffer. The ring buffer has a starting address and an ending address set in a recording area thereof to be able to record a moving image of 15 minutes. The recording control unit records the game images from the starting address to the ending address in the order of addresses set in advance and then, overwrites the game images by returning to the staring address and repeats such process. During game play by a user, the recording control unit is constantly background-recording the game images onto the ring buffer. By this, when the user makes an excellent play, for example, he/she carries out a predetermined moving image saving operation with use of an input apparatus, so that a game moving image file of 15 minutes is created. After the moving image file has been created, the user can reproduce the moving image file and watch his/her play image.

In the information processing apparatus disclosed in PTL 1, when the user carries out the moving image saving operation, a file system copies image data recorded on the ring buffer to a recording area which is different from the ring buffer. Specifically, the file system reserves a recording area for copying the image data, creates a header and a footer of the moving image file, and copies the image data recorded on the ring buffer onto an area located between the header and the footer, to create a moving image file.

CITATION LIST

Patent Literature

[PTL]
Japanese Patent Laid-open No. 2014-92991

SUMMARY

Technical Problem

When images have high resolution and the data size of one frame becomes large, it takes a long time to create a moving image file because the length of time needed for a process for copying image data becomes long. Therefore, a user cannot immediately reproduce the moving image file even if he/she carries out the moving image saving operation with use of the input apparatus.

Accordingly, it is an object of the present invention to realize a technology which enables image data recorded on a ring buffer to be reproduced promptly.

Solution to Problem

In order to solve the above problem, an information processing apparatus according to one mode of the present invention includes a ring buffer for recording image data and a file generation unit configured to generate a map file used for reproducing the image data recorded on the ring buffer in the order in which the image data has been recorded on the ring buffer.

A file generation method according to another mode of the present invention includes a step of recording image data onto a ring buffer, and a file step of generating a map file used for reproducing the image data recorded on the ring buffer in the order in which the image data has been recorded on the ring buffer.

Incidentally, any combinations of the above-described constituent elements as well as representations of the present invention obtained by converting one to another among methods, apparatuses, systems, recording media, computer programs, and the like are also effective as modes of the present invention.

Advantageous Effect of Invention

According to the present invention, there can be provided a technology which enables image data recorded on a ring buffer to be reproduced promptly.

BRIEF DESCRIPTION OF DRAWINGS

FIG. 5 is a diagram illustrating another example of a map file.

FIG. 6 is a diagram illustrating another example of a map file.

DESCRIPTION OF EMBODIMENT

Figure 1:
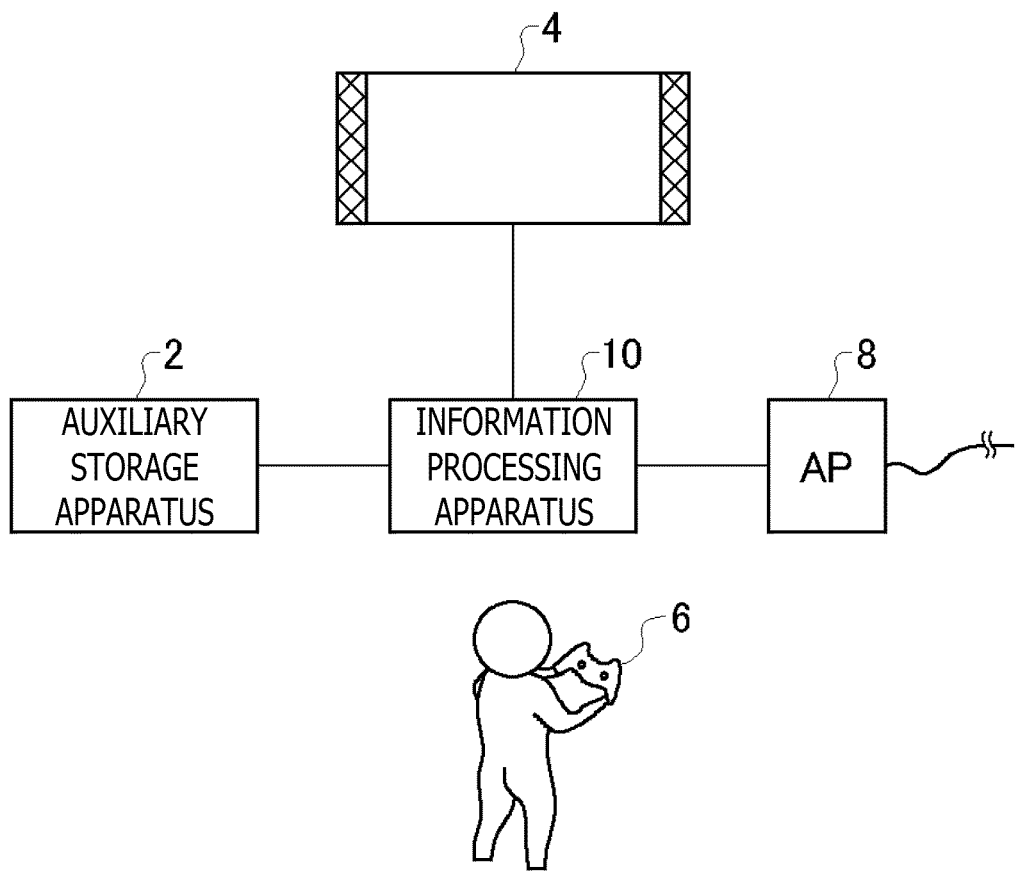
FIG. 1 is a diagram illustrating an information processing system according to an embodiment.

FIG. 1 illustrates an information processing system 1 according to an embodiment of the present invention. An information processing apparatus 10 is connected to an input apparatus 6 operated by a user, by wireless or wire connection, and the input apparatus 6 outputs operation information indicating a result of the operation by the user to the information processing apparatus 10. When receiving the operation information from the input apparatus 6, the information processing apparatus 10 reflects the operation information in processing of OS (operating system) (system software) or application software and makes a result of the processing output from an output apparatus 4. In the information processing system 1, the information processing apparatus 10 is a game apparatus that executes a game program, and the input apparatus 6 may be a device, such as a game controller, that supplies the information regarding an operation performed by the user to the information processing apparatus 10. The input apparatus 6 includes a plurality of input units such as a plurality of push-type operating buttons, an analog stick by which an analog quantity can be input, and a rotation-type button. The output apparatus 4 may be a television set including a display for outputting an image and a speaker for outputting sound, or may be a head mounted display.

An auxiliary storage apparatus 2 may be a built-in storage apparatus, or may be an external storage apparatus connected to the information processing apparatus 10 via a USB (Universal Serial Bus) or the like. The auxiliary storage apparatus 2 of the embodiment includes an SSD (Solid State Drive). At present, four types of SSDs have been developed as described below.

SLC (Single-level cell) is a flash memory for storing one-bit information per cell. The SLC has higher durability than any other type of level cells because the SLC performs data management with two types, i.e., ON and OFF, but on the other hand, it is expensive. MLC (Multi-level cell) is a flash memory for storing two-bit information per cell and is less expensive than the SLC but inferior in durability. TLC is a flash memory for storing three-bit information per cell and is the most popular at present. The TLC is less expensive than the MLC but inferior in durability. QLC (Quad-level cell) is a flash memory for storing four-bit information per cell and is less expensive than the TLC but inferior in durability. The auxiliary storage apparatus 2 of the embodiment includes plural types of SSDs having different levels of durability.

An access point (hereinafter, referred to as an "AP") 8 has functions of a wireless access point and a router, and the information processing apparatus 10 is connected to the AP 8 via wireless or wire connection and is able to communicate with a server on an external network such as the Internet.

Figure 2:
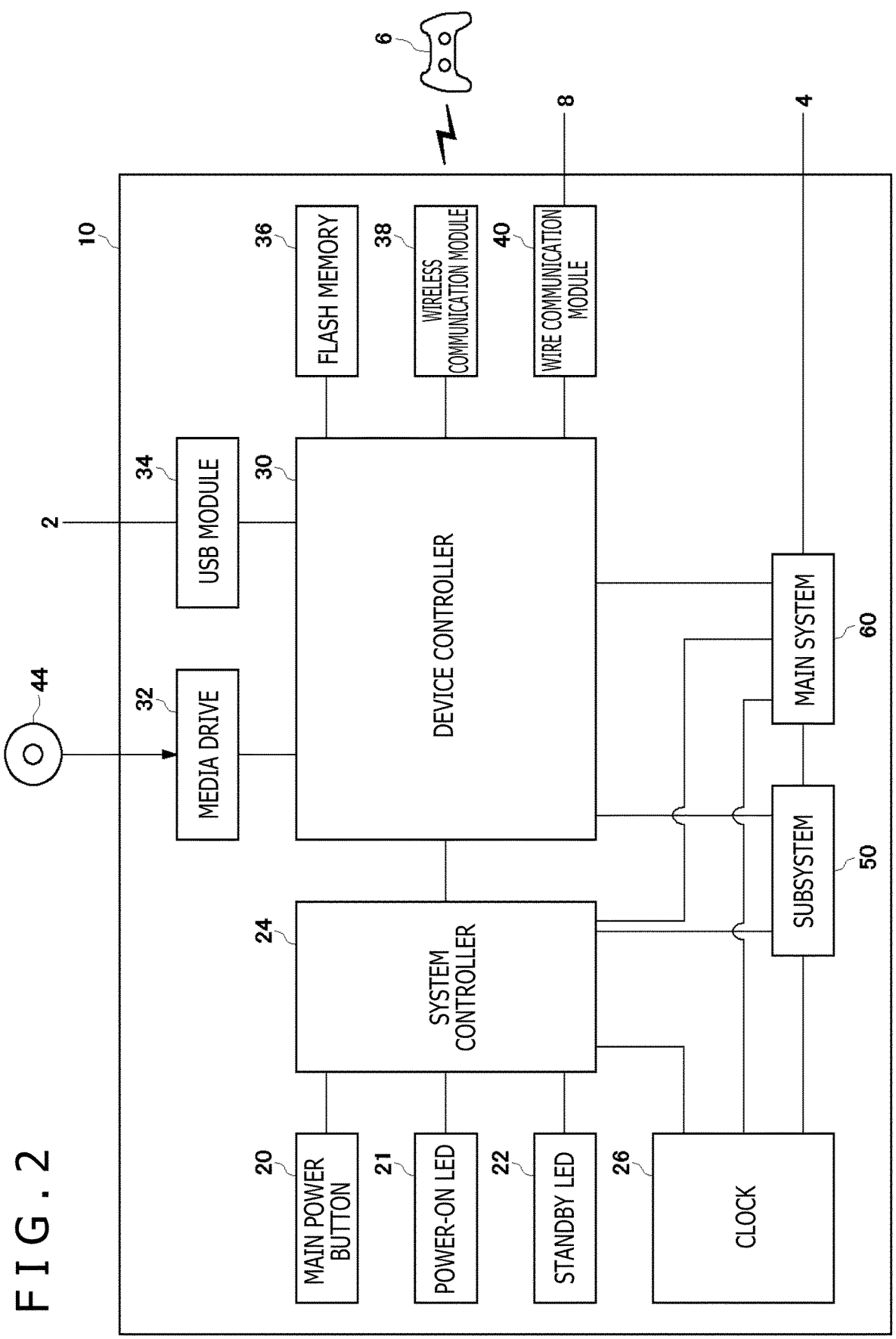
FIG. 2 is a diagram illustrating a hardware configuration of an information processing apparatus.

FIG. 2 illustrates hardware configuration of the information processing apparatus 10. The information processing apparatus 10 includes a main power button 20, a power-ON LED (light emitting diode) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory and a memory controller as a main storage device, a GPU (Graphics Processing Unit), and the like. The GPU is used mainly for arithmetic processing of a game program. These functions may be configured as a system-on-chip and formed on one chip. The main CPU has a function of executing a game program recorded on the auxiliary storage apparatus 2.

The subsystem 50 includes a sub-CPU, a memory and a memory controller as a main storage device, and the like, but not a GPU, and does not have a function of executing a game program. The number of circuit gates of the sub-CPU is smaller than the number of circuit gates of the main CPU. The operation power consumption of the sub-CPU is lower than the operation power consumption of the main CPU. The sub-CPU operates even while the main CPU is in a standby state, and the processing functions of the sub-CPU are restricted to maintain the power consumption of the sub-CPU low.

The main power button 20 is an input section through which the user performs operation input, and is provided on a front face of a housing of the information processing apparatus 10 and is operated to turn on or off the power supply to the main system 60 of the information processing apparatus 10. The power-ON LED 21 is lit when the main power button 20 is turned on, and the standby LED 22 is lit when the main power button 20 is turned off.

The system controller 24 detects depression of the main power button 20 by the user. When the main power button 20 is depressed while the main power supply is in an off state, the system controller 24 acquires the depression operation as a "turn-on instruction." On the other hand, when the main power button 20 is depressed while the main power supply is in an on state, the system controller 24 acquires the depression operation as a "turn-off instruction."

The clock 26 is a real-time clock, generates current date and time information, and supplies the information to the system controller 24, the subsystem 50, and the main system 60. The device controller 30 is configured as an LSI (Large-Scale Integrated Circuit) that passes information between devices as a southbridge does. As illustrated in the figure, the device controller 30 is connected to such devices as the system controller 24, the media drive 32, the USB module 34, the flash memory 36, the wireless communication module 38, the wire communication module 40, the subsystem 50, and the main system 60. The device controller 30 accommodates a difference in the electrical characteristics and a difference in the data transfer rates among respective devices, and controls the timing of data transfer.

The media drive 32 is a drive device to load and drive a ROM (read only memory) medium 44, on which software such as a game and license information are recorded, and to read out a program, data, and the like from the ROM medium 44. The ROM medium 44 is a read-only recording medium such as an optical disk, a magneto-optical disk, or a Blu-ray disk.

The USB module 34 is a module to be connected to an external device via a USB cable. The USB module 34 may be connected to the auxiliary storage apparatus 2 via a USB cable. The flash memory 36 is an auxiliary storage device configuring an internal storage. The wireless communication module 38 performs wireless communication with, for example, the input apparatus 6, under such a communication protocol as the Bluetooth (registered trademark) protocol or the IEEE (Institute of Electrical and Electronics Engineering) 802.11 protocol. Incidentally, the wireless communication module 38 may support a digital mobile telephone system. The wire communication module 40 performs wire communication with an external device and is connected to an external network via the AP 8, for example.

Figure 3:
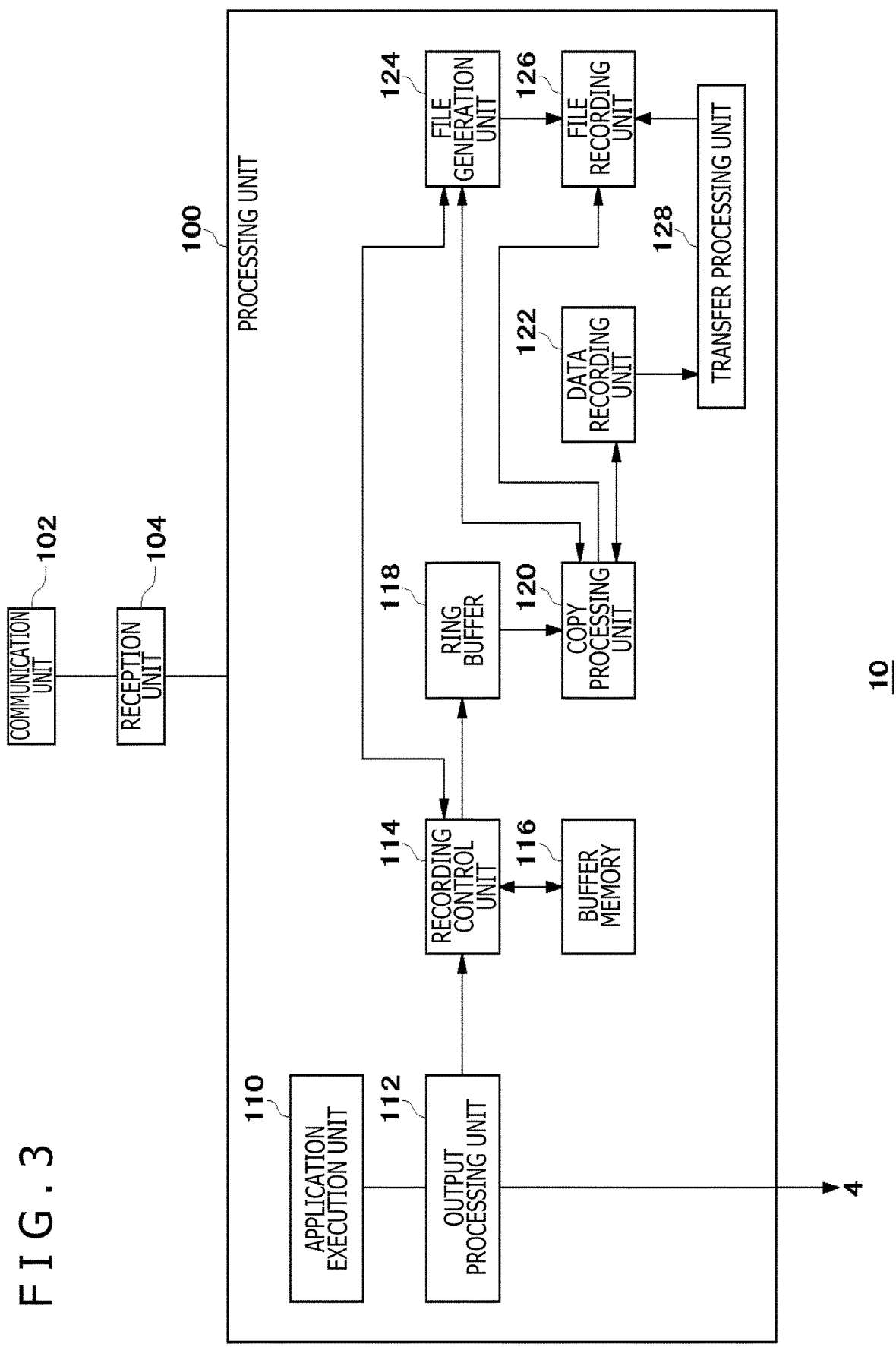
FIG. 3 is a diagram illustrating functional blocks of the information processing apparatus.

FIG. 3 illustrates functional blocks of the information processing apparatus 10. The information processing apparatus 10 includes a processing unit 100, a communication unit 102, and a reception unit 104. The processing unit 100 includes an application execution unit 110, an output processing unit 112, a recording control unit 114, a buffer memory 116, a ring buffer 118, a copy processing unit 120, a data recording unit 122, a file generation unit 124, a file recording unit 126, and a transfer processing unit 128. The communication unit 102 is represented as a configuration having functions of both the wireless communication module 38 and the wire communication module 40 illustrated in FIG. 2. The ring buffer 118, the data recording unit 122, and the file recording unit 126 may be configured in a recording area of the auxiliary storage apparatus 2.

A configuration of the processing unit 100, in terms of hardware components, is implemented with a CPU, a memory, a program loaded in the memory, a storage, and the like of any computer, but the configuration is illustrated here as the functional blocks implemented by cooperation among the hardware components. Accordingly, it can be recognized by those skilled in the art that these functional blocks can be implemented in various forms including hardware only, software only, or a combination of the two. The processing unit 100 has a function of recording, on the background, game images which are displayed on the output apparatus 4.

The reception unit 104 receives, through the communication unit 102, information regarding an operation of the input apparatus 6 performed by the user. The application execution unit 110 of the embodiment executes game software. The game software carries out arithmetic processing for moving a player character in a virtual space, by using the information regarding the operation performed by the user. The output processing unit 112 acquires a result of the arithmetic processing from the game software, generates image data and sound data of the game, and has the image data and the sound data output from the output apparatus 4. The output processing unit 112 may include a GPU (Graphics Processing Unit) for executing a rendering process or the like. As the output processing unit 112 generates image data of the game, it can be called an "image generation unit."

In the information processing apparatus 10 of the embodiment, the output processing unit 112 generates the image data and the sound data of the game, have them output from the output apparatus 4, and supplies the same to the recording control unit 114. In the following description, image data and sound data of a game will collectively be referred to as a "game image" or "game image data." The recording control unit 114 records the game image data generated by the output processing unit 112 onto the ring buffer 118 together with time information (time stamp).

The ring buffer 118 has a starting address and an ending address set in a recording area of the auxiliary storage apparatus 2 so that the ring buffer 118 can record a game moving image of 15 minutes, for example. The starting address and the ending address of the ring buffer 118 may be set by default at the time of shipment of the information processing apparatus 10. In a case where the auxiliary storage apparatus 2 includes plural types of SSDs having different levels of durability, the ring buffer 118 is preferably formed in a type of level cell having superior durability such as SLC (Single-level cell), for example, because the ring buffer 118 is used highly frequently.

The recording control unit 114 records the game image data from the starting address to the ending address of the ring buffer 118 in the order of addresses set in advance and then, overwrites the game image data by returning to the staring address and repeats such process. During game play by the user, the recording control unit 114 is constantly recording the game image data onto the ring buffer 118. The recording control unit 114 records high resolution game image data, for example, game image data of QHFD (Quad Full High Definition: 3840×2160), generated by the output processing unit 112 onto the ring buffer 118.

During the game play, the user can carry out a predetermined moving image saving operation by using the input apparatus 6. The moving image saving operation is an operation for saving the image data recorded on the ring buffer 118, as a moving image file. For example, the moving image saving operation may be input from a predetermined button of the input apparatus 6, or may be a decision operation over a GUI (graphical user interface) for saving a moving image displayed on the output apparatus 4. The user carries out the moving image saving operation by using the input apparatus 6, when he/she knocks out the final boss with an excellent technique, for example. The moving image saving operation is received by the reception unit 104.

In the processing unit 100 of the embodiment, the copy processing unit 120 copies the image data recorded on the ring buffer 118 onto the data recording unit 122 which is different from the ring buffer 118, and generates a moving image file. The data recording unit 122 may be formed in a type of level cell less expensive than the ring buffer 118, for example, TLC (Triple-level cell). If the image data recorded on the ring buffer 118 is of low resolution, the copy processing unit 120 can generate a moving image file by performing the process of copying the image data onto the data recording unit 122 in a short period of time. In this instance, after performing the moving image saving operation, the user can promptly reproduce the moving image file and watch his/her own play image.

In the embodiment, however, because the image data recorded on the ring buffer 118 is of high resolution, it takes some time to perform the process of copying the image data onto the data recording unit 122. Therefore, even though the user wants to immediately reproduce the moving image file and watch his/her own play image after performing a moving image saving operation, he/she has to wait until the moving image file is generated.

Accordingly, in the embodiment, there is provided a technology which enables the image data recorded on the ring buffer 118 to be promptly reproduced after the user has performed a moving image saving operation. Specifically, the file generation unit 124 generates a map file used for reproducing the image data recorded on the ring buffer 118 in the order the image data has been recorded on the ring buffer 118. The generated map file is stored in the file recording unit 126.

Figure 4:
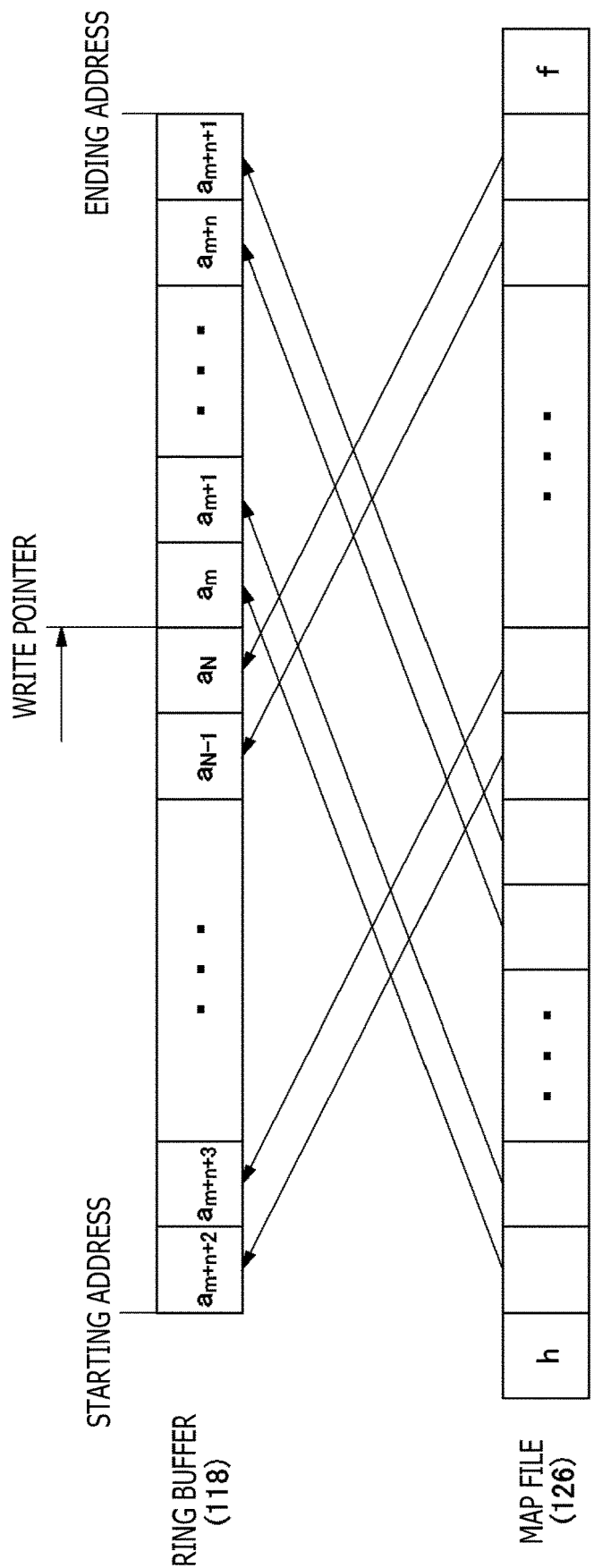
FIG. 4 is a diagram illustrating an example of a map file.

FIG. 4 illustrates an example of the image data recorded on the ring buffer 118 and the map file stored in the file recording unit 126.

In the ring buffer 118, writing of the image data is carried out in units of data blocks. The recording control unit 114 divides the image data generated by the output processing unit 112 into units of data blocks and records the image data onto the ring buffer 118. In FIG. 4, each space separated on the ring buffer 118 illustrates a data block, and the position of a write pointer indicates a boundary between the latest data block and the oldest data block. In the example illustrated in FIG. 4, "$a_m$" is image data which has the oldest recording time and is to be overwritten next, and "$a_N$" is image data which has the latest recording time.

When the user performs the moving image saving operation by using the input apparatus 6, the reception unit 104 receives the moving image saving operation and notifies the file generation unit 124 that the reception unit 104 has received the moving image saving operation. The file generation unit 124, receiving the notice, acquires from the recording control unit 114 information relating to the recording order of the data blocks on the ring buffer 118. The information relating to the recording order may be information for identifying data blocks (data block ID (identification)) as sorted in the order starting from the oldest image data recorded in the data blocks, or alternatively, may be information relating the data block ID to the data recording time. In the embodiment illustrated in FIG. 4, the recording control unit 114 is provided with information indicating that the data block in which the image data "$a_m$" is recorded is the oldest, that the data block in which the image data "$a_{m+1}$" is recorded is the second oldest, . . . , and that the data block in which the image data "$a_N$" is recorded is the latest.

The file generation unit 124, after acquiring the information relating to the recording order of the data blocks, generates a map file used for reproducing the image data in the order the image data has been recorded on the ring buffer 118, and records the map file on the file recording unit 126. The file recording unit 126 may be formed in a type of level cell less expensive than the ring buffer 118, for example, TLC (Triple-level cell). Described with reference to FIG. 4, the file generation unit 124 creates a header (h) and a footer (f) and generates a map file designating addresses of the referenced data blocks, according to the recording order on the ring buffer 118. Incidentally, though the file generation unit 124 creates real data for the header and footer in this example, the header and footer may be created by referring to real data of the header and footer of the moving image file created on the data recording unit 122.

Because data copying is not carried out in generating a map file, the file generation unit 124 can instantly generate a map file. After the map file illustrated in FIG. 4 is generated, a moving image reproducing unit (not illustrated) reproduces a game moving image of 15 minutes by using the map file recorded on the file recording unit 126 and the referenced image data recorded on the ring buffer 118, on the premise that the recorded contents of the ring buffer 118 are not updated.

The file generation unit 124 provides the recording control unit 114 with information for identifying those data blocks of the ring buffer 118 (data block ID) which are referenced in the map file. In the example illustrated in FIG. 4, because all the data blocks of the ring buffer 118 are referenced, the file generation unit 124 provides the recording control unit 114 with all the data block IDs.

The recording control unit 114, being provided with data block IDs referenced in the map file, prohibits destruction of the image data in the corresponding data blocks. In other words, the recording control unit 114 does not overwrite the referenced data blocks. In the ring buffer 118 illustrated in FIG. 4, the data block to be overwritten and updated next (that is, the oldest data block) is the data block in which "$a_m$" is recorded. If the data block is set as reference in the map file, the recording control unit 114 has image data that has been generated by the output processing unit 112 temporarily stored in the buffer memory 116, and waits to overwrite and update the image data in the data block.

Incidentally, because the ring buffer 118 is provided to sequentially record image data generated by the output processing unit 112, it is necessary to swiftly resolve such a situation where image data cannot be recorded. As such, when the file generation unit 124 generates the map file illustrated in FIG. 4, the copy processing unit 120 immediately starts a process for copying the image data recorded on the ring buffer 118 to the data recording unit 122. When the copy processing unit 120 copies the image data in the data block in the ring buffer 118 into a data block in the data recording unit 122, the file generation unit 124 updates, in the map file, an address of the copied data block in the ring buffer 118 with an address of the data block in the data recording unit 122.

FIG. 5 illustrates an example of the map file held in the file recording unit 126. Incidentally, in the example illustrated in FIG. 5, the map file refers to the header and footer of the moving image file in the data recording unit 122, but as illustrated in FIG. 4, real data of the header and footer may be added to the map file.

The example depicted in FIG. 5 illustrates a state where pieces of data "$a_m$" and "$a_{m+1}$" on the ring buffer 118 have been copied onto the data recording unit 122. The copy processing unit 120 notifies the file generation unit 124 of information for identifying the data block for which copying has been completed (data block ID) and an address of the data block in the data recording unit 122, each time the copy processing unit 120 has completed copying of the data block. The file generation unit 124 updates an address of the data block in the ring buffer 118 as a copy source with an address of the data block in the data recording unit 122 as a copy destination, each time the file generation unit 124 receives the notice.

The copy processing unit 120 copies the image data recorded on the ring buffer 118 onto the data recording unit 122 in the order the image data has been recorded on the ring buffer 118. In other words, the copy processing unit 120 copies the image data onto the data recording unit 122 in units of data blocks, starting from the oldest image data on the ring buffer 118. In the example illustrated in FIG. 5, "$a_m$" is copied to the data recording unit 122 first, and "$a_{m+1}$" is copied next. In the data recording unit 122, image data of each data block is recorded at the locations continuing from the header.

When the file generation unit 124 switches the reference from a data block in the ring buffer 118 to a data block in the data recording unit 122, the file generation unit 124 notifies the recording control unit 114 of information for identifying the original data block in the ring buffer 118. By this, the recording control unit 114 recognizes that image data of the notified data block can be destroyed. In the example illustrated in FIG. 5, the recording control unit 114 first recognizes that "$a_m$" may be destroyed and then recognizes that "$a_{m+1}$" may be destroyed. When the recording control unit 114 recognizes a data block in which image data may be destroyed, it overwrites the image data in the data block with the image data temporarily stored in the buffer memory 116.

FIG. 6 illustrates an example of a map file held in the file recording unit 126. This example illustrates that all the pieces of image data which have been recorded on the ring buffer 118 at the time when the user has performed a moving image saving operation are copied onto the data recording unit 122, and that a map file refers to the data blocks in the data recording unit 122. At this time, a moving image file of 15 minutes is created and stored in the data recording unit 122.

The moving image reproducing unit (not illustrated) can reproduce a game moving image of 15 minutes, by using the map file recorded on the file recording unit 126 and the image data recorded on the data recording unit 122 which is referenced. Incidentally, the moving image reproducing unit can also directly reproduce the moving image file stored in the data recording unit 122.

Besides, it is possible for the transfer processing unit 128 to transfer image data present in the reference (data recording unit 122) to the map file. In that case, the map file needs to have the same number of data blocks as the moving image file.

The present invention has been described above in reference to the embodiment thereof. The embodiment is illustrative, and it is to be understood by those skilled in the art that various modifications are possible in combination of constituent elements and processing processes of the embodiment and that such modifications also fall within the scope of the present invention.

Though the auxiliary storage apparatus 2 is described in the embodiment as including plural types of SSDs, it may also include an HDD (hard disk drive).

INDUSTRIAL APPLICABILITY

The present invention can be used in a technical field for recording image data on a ring buffer.

REFERENCE SIGNS LIST

1: Information processing system
2: Auxiliary storage apparatus
10: Information processing apparatus
100: Processing unit
102: Communication unit
104: Reception unit
110: Application execution unit
112: Output processing unit 114: Recording control unit
116: Buffer memory
118: Ring buffer
120: Copy processing unit
122: Data recording unit
124: File generation unit
126: File recording unit
128: Transfer processing unit

The invention claimed is:

1. An information processing apparatus, comprising:
a ring buffer for recording image data;
a memory different than the ring buffer; and
circuitry configured to
generate a map file,
reproduce, using the map file, the image data recorded on the ring buffer in an order the image data has been recorded on the ring buffer,
copy the image data recorded on the ring buffer onto the memory, and
as the image data in a data block in the ring buffer is copied onto a data block in the memory, update, in the map file, the address of the copied data block in the ring buffer with an address of the data block in the memory.

2. The information processing apparatus according to claim 1, wherein the circuitry is further configured to
generate the map file designating an address of a data block in the ring buffer.

3. The information processing apparatus according to claim 1, wherein the circuitry is further configured to
copy the image data recorded on the ring buffer onto the memory according to the order the image data has been recorded on the ring buffer.

4. The information processing apparatus according to claim 1, wherein the circuitry is further configured to
receive information regarding an operation of an input apparatus by a user,
wherein, in response to receiving information regarding a predetermined operation of the input apparatus, generate the map file.

5. A file generation method comprising:
recording image data on a ring buffer;
generating a map file used for reproducing the image data recorded on the ring buffer in an order the image data has been recorded on the ring buffer;
copying the image data recorded on the ring buffer onto a memory different than the ring buffer; and
as the image data in a data block in the ring buffer is copied onto a data block in the memory, update, in the map file, the address of the copied data block in the ring buffer with an address of the data block in the memory.

6. A non-transitory computer-readable storage medium storing computer-readable instructions thereon which, when executed by a computer, cause the computer to perform a method, the method comprising:
recording image data on a ring buffer; and
generating a map file used for reproducing the image data recorded on the ring buffer in an order the image data has been recorded on the ring buffer;
copying the image data recorded on the ring buffer onto a memory different than the ring buffer; and
as the image data in a data block in the ring buffer is copied onto a data block in the memory, update, in the map file, the address of the copied data block in the ring buffer with an address of the data block in the memory..

* * * * *